US006693890B1

(12) United States Patent
Yick et al.

(10) Patent No.: US 6,693,890 B1
(45) Date of Patent: Feb. 17, 2004

(54) FAST ACQUISITION MODULE FOR A CODE DIVISION MULTIPLE ACCESS (CDMA) WIRELESS LOCAL LOOP (WLL) SYSTEM

(75) Inventors: Karl Yick, Alameda, CA (US); Oswald Correya, Hayward, CA (US); Ronald Ross, San Francisco, CA (US); Christopher Flores, Oakland, CA (US)

(73) Assignee: Carlson Wireless, Inc., Redway, CA (US)

( * ) Notice: Subject to any disclaimer, the term of this patent is extended or adjusted under 35 U.S.C. 154(b) by 760 days.

(21) Appl. No.: 09/594,468

(22) Filed: Jun. 14, 2000

Related U.S. Application Data

(63) Continuation-in-part of application No. 09/518,579, filed on Mar. 3, 2000.

(51) Int. Cl.[7] .................................................. H04B 7/216

(52) U.S. Cl. ........................................ 370/342; 375/152

(58) Field of Search ................................ 370/321, 335, 370/342, 503, 509, 510, 512, 513, 514, 515; 375/130, 134, 136, 137, 140, 143, 145, 147, 149, 152

(56) References Cited

U.S. PATENT DOCUMENTS

| | | | | |
|---|---|---|---|---|
| 5,881,098 A | * | 3/1999 | Tzou | 375/152 |
| 5,950,131 A | * | 9/1999 | Vilmur | 455/434 |
| 6,154,171 A | * | 11/2000 | Sullivan | 342/357.05 |
| 6,385,259 B1 | * | 5/2002 | Sung et al. | 375/343 |
| 6,560,271 B1 | * | 5/2003 | Han | 375/137 |

* cited by examiner

Primary Examiner—Kwang Bin Yao
(74) Attorney, Agent, or Firm—Haynes Beffel & Wolfeld LLP

(57) ABSTRACT

An acquisition module for acquiring signal timing in a CDMA system has a register for storing and organizing synchronization code, at least 4 match filters for match filtering between I/Q samples and the corresponding synchronization code, at least 4 absolute value blocks for determining absolute values of match filtering results, a summation function for summing results obtained through match filtering and through absolute value taking, and a control logic for controlling the acquisition process, characterized in that the acquisition module loads a 64-bit section of synchronization code and I/Q complex samples and match filters them in a simultaneous manner and, upon registering a value greater than a preset threshold, acquires an initial timing, the initial timing being verified over the remaining 64-bit sections of synchronization code using the same control circuitry used in acquiring the timing.

9 Claims, 8 Drawing Sheets

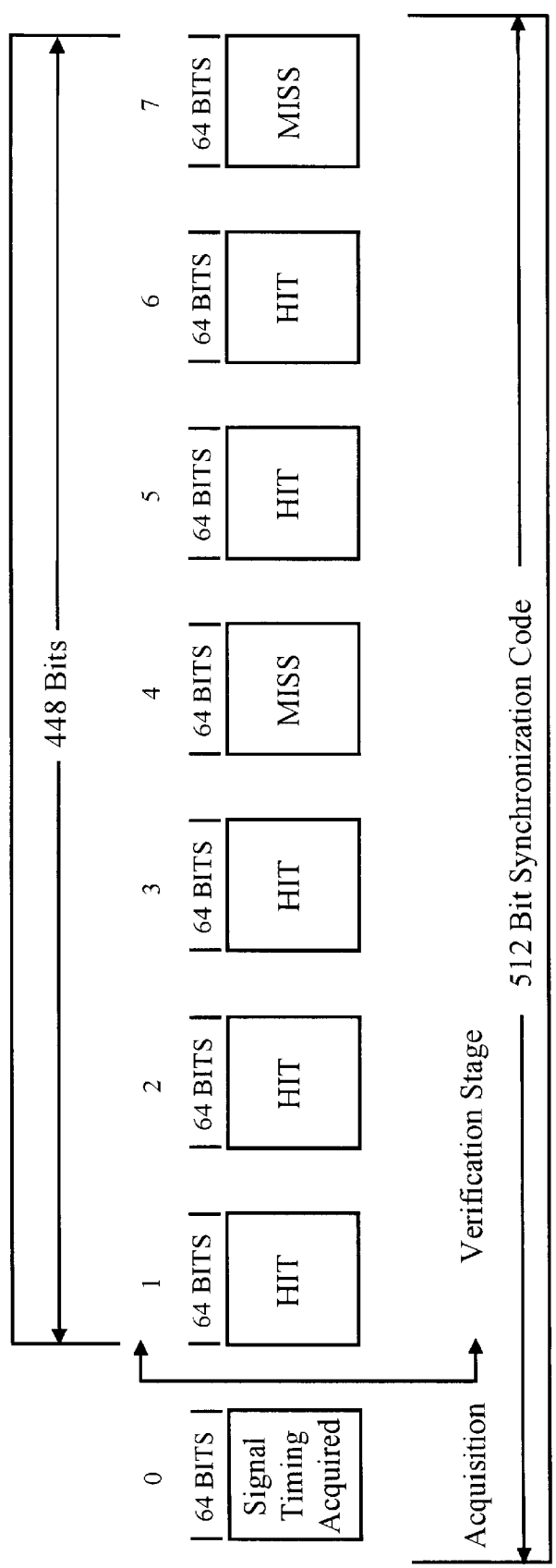
Fig. 8 (verification)

FAST ACQUISITION MODULE FOR A CODE DIVISION MULTIPLE ACCESS (CDMA) WIRELESS LOCAL LOOP (WLL) SYSTEM

CROSS-REFERENCE TO RELATED DOCUMENTS

The present invention is a continuation in part (CIP) to a patent application Ser. No. 09/518,579 entitled "Method and Apparatus for Tracking and Qualifying Signals in a Code Division Multiple Access Communication System" filed on Mar. 3, 2000 disclosure of which is incorporated herein by reference.

FIELD OF THE INVENTION

The present invention is in the field of wireless communications systems including Code-Division Multiple Access (CDMA) systems and pertains more particularly to methods and apparatus for fast acquisition of an incoming signal in a Wireless Local Loop (WLL) telephony system.

BACKGROUND OF THE INVENTION

Wireless communication of all sorts, at the time of this patent application, is a rapidly expanding technology. Wireless communication functional innovations, such as Time-Division-Multiple-Access (TDMA) systems and Frequency-Division-Multiple-Access (FDMA) systems for sharing communication bands are well known, and much developmental effort is being expended to provide improvements to such systems. One in which considerable development is being done is in the area of wireless local loop (WLL) telephony systems, designed to deliver reliable telephone service to areas lacking adequate ground-line infrastructure.

A typical WLL multiple-access communication system as known in prior art uses TDMA or FDMA technology. Larger cellular communications systems, wherein participants are highly mobile, commonly use a Code-Division-Multiple-Access (CDMA) technology. CDMA systems use a well-known method known in the art as spread spectrum transmission wherein signal spreading and de-spreading is practiced in order to optimize signal strength. Cellular systems designed with CDMA spread-spectrum technology offer greater operational flexibility and a greater overall system capacity (number of ongoing channels at any given time) than do wireless systems that use FDMA or TDMA access methods.

A typical WLL system has a base station (BS) connected to a telephony switch via telephony trunks that are well known in the art. The BS has the ability of communicating via wireless broadcast and reception with Remote Access Units (RAU) installed within range of the base station, as determined by location, broadcast power, antenna design and so on. The connected telephony switching provides access to a land-based telephone network, such as a Public-Switched Telephone Network (PSTN). Incoming events (telephone calls) are received by the base station from the PSTN and connected with sub terminals via the wireless CDMA system. Client RAU typically consists of a client's telephone, fax machine, and/or other communication devices that are connected to the Remote Access Unit (RAU), which is the wireless receiver/transmitter device that communicates with a BS.

Outgoing events (calls from the sub terminals) are made from the RAU via the CDMA system to the BS, and then connected over telephony trunks to a connected telephone switch, and then on to their ultimate destinations over the PSTN, or a connected public or private telephone network.

Code division multiple access (CDMA) technology is used mostly by cellular systems wherein devices are mobile. However, a WLL system known to the inventor uses a CDMA method including signal spreading and de-spreading technology. Such a system typically has a better signal recovery signature than those prior art systems using TDMA or FDMA.

An ongoing challenge associated with the practice of a typical WLL system, whether CDMA, FDMA, or TDMA, is the ability to maintain an optimum signal at both a BS and at a RAU. There are many potential challenges to overcome in order to facilitate strong signal transmission and reception between a BS and an RAU. For example, in a line-of-sight (LOS) system wherein a BS and RAU are within line-of-sight of each other, bad weather, significant temperature fluctuation, or a temporary physical obstacle may interfere with a transmitted signal causing it to fade very fast. Prior art WLL systems have a minimum signal-strength threshold (measured at peak) assigned to them and ignore any weak signals that fall below such thresholds. The result is signal fadeout or dropout, causing audible anomaly in an ongoing call.

Another type of WLL system operates in a multi-path environment. This type of system is generally larger (more range) than a LOS system. In a multi-path system, signals travel by varied and multiple paths and arrive at the receiver at different times, strengths, etc. Structure or terrain is generally responsible for an existing multi-path environment in a WLL system. Structure interferes with signal propagation such that many copies of the original signal arrive by various (multiple) paths and not at the same time.

A system known to the inventor and taught in the cross-referenced patent application enables a received spread signal to be continually stripped of data even if it falls below an acceptable strength threshold. While data is utilized from weak received signals, timing is only generated from the strongest received spread signals. In this way, voice/data dropout is minimized. This process works for both single and multi-path applications.

In addition to minimizing voice or data dropout, it is also desired that a faster signal acquisition may be accomplished at a receiving station without incurring added expense of a complicated module and procedure. In prior art systems, an acquisition module is used to acquire initial signal timing for a received signal before the signal is tracked and refined in signal tracking circuitry. An acquisition module functions to compute the values of a synchronization code associated with a received signal to identify a unique base station within a cell, and to acquire an acceptable initial timing for the signal.

In prior art CDMA systems, the acquisition process uses significant circuitry, hardware, and software to perform acquisition function of signal timing. This is due, in part, to a fact that an entire synchronization code sequence must be computed before an acceptable initial timing is established. Also in prior art systems, a verification stage for verifying and initial signal timing for a signal requires an additional set of circuitry.

What is clearly needed is a fast acquisition module that can sectorize a synchronization code sequence and simultaneously compute and verify signal timing using a single set of circuitry. Such a module could be made smaller and more inexpensively as well as provide faster timing initialization and verification when compared with prior art systems.

SUMMARY OF THE INVENTION

In a preferred embodiment of the present invention an acquisition module for acquiring signal timing in a CDMA system is provided comprising a register for storing and organizing synchronization code; at least 4 match filters for match filtering between I/Q samples and the corresponding synchronization code; at least 4 absolute value blocks for determining absolute values of match filtering results; a summation function for summing results obtained through match filtering and through absolute value taking; and a control logic for controlling the acquisition process, characterized in that the acquisition module loads a 64-bit section of synchronization code and I/Q complex samples and match filters them in a simultaneous manner and, upon registering a value greater than a preset threshold, acquires an initial timing, the initial timing being verified over the remaining 64-bit sections of synchronization code using the same control circuitry used in acquiring the timing.

In a preferred embodiment both small and large phase error samples are computed using the same control circuitry. Also in this embodiment, match filtering is performed at ½ chip intervals. Also in a preferred embodiment, during the initial verification performed on the first 64-bits of code after acquisition, a fine tuning operation is performed by checking for a better peak correlation at ½-chip offset positions over a duration of 1.5 chips.

In another aspect of the invention a method for acquiring signal timing for a CDMA system is provided comprising the steps of a) loading a 64-bit section of synchronization code into an acquisition module; b) receiving 64 bits of I/Q complex samples corresponding to the 64-bit section synchronization code; c) match filtering the synchronization code and the I/Q complex samples simultaneously using at least 4 16-bit match filters; d) comparing match filtering results with a preset threshold; and e) depending upon the comparison, determining whether a received signal timing is acceptable for acquisition and verification.

In a preferred aspect of the above method, in step e), a first comparison of match-filtering results with a preset threshold determines whether or not an initial timing will be acquired, and subsequent comparisons determined whether or not an acquired signal timing will be verified. Also in a preferred aspect, in step (c), both small and large phase error samples are computed using the same control circuitry and match filtering is performed at ½ chip intervals.

In another preferred aspect of the above method, in step (c), during the initial verification performed on the first 64-bits of code after acquisition, a fine tuning operation is performed by checking for a better peak correlation at ½-chip offset positions over a duration of 1.5 chips.

In various embodiments taught in enabling detail below, for the first time a fast acquisition module is provided that can sectorize a synchronization code sequence and simultaneously compute and verify signal timing using a single set of circuitry.

BRIEF DESCRIPTION OF THE DRAWING FIGURES

FIG. 8 is a block diagram illustrating an acquisition and verification process according to an embodiment of a present invention.

DESCRIPTION OF THE PREFERRED EMBODIMENTS

As described in the background section a WLL system of the type to which the present invention may apply uses, in a preferred embodiment, an narrow-band CDMA technology that provides wireless communication channels between numerous subscribers and a Public Switched Telephone Network (PSTN). Such a WLL system overview is presented in some detail below.

Figure 1:
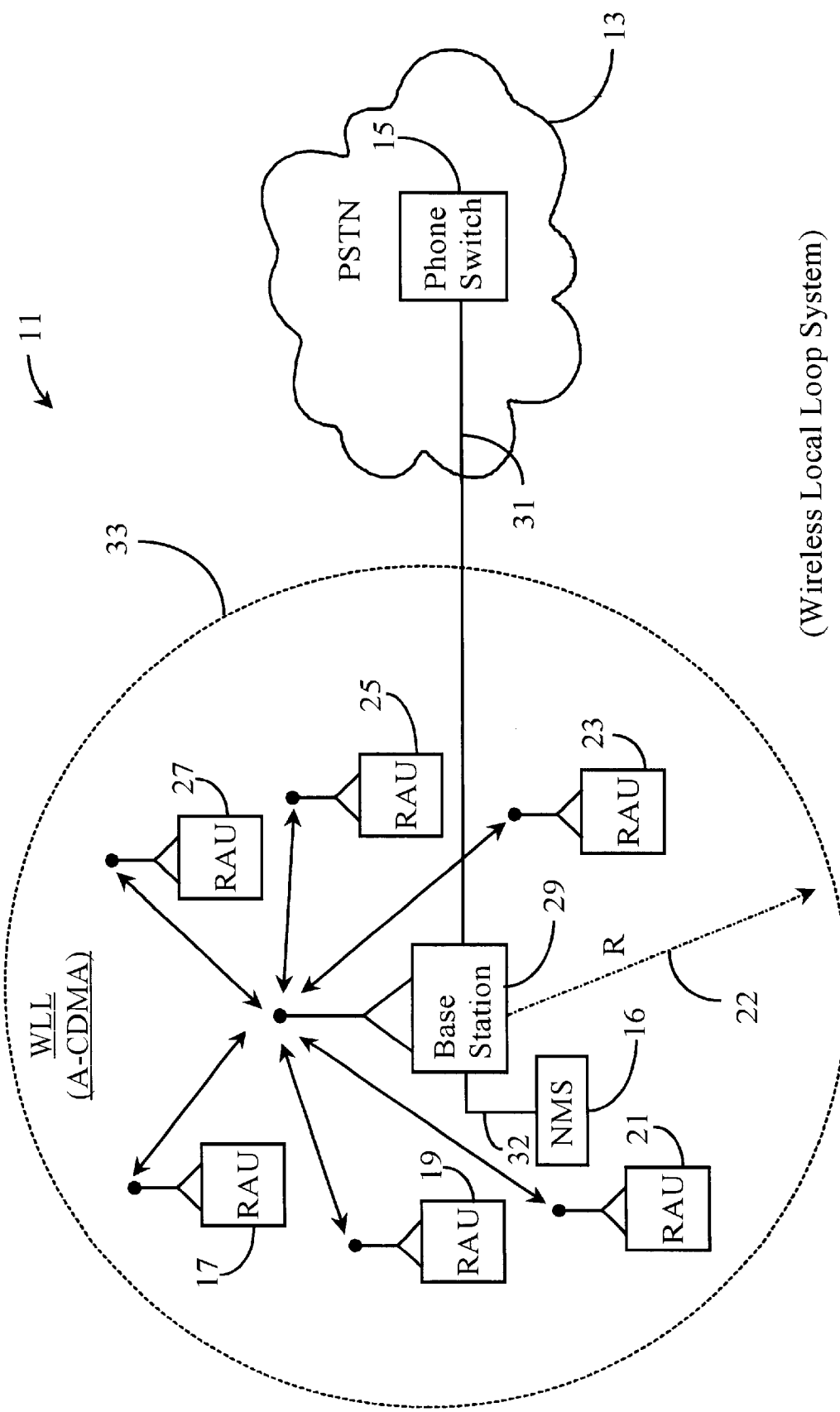
FIG. 1 is an exemplary overview of a wireless local loop WLL system using Code-Division-Multiple-Access (CDMA) technology as known to the inventor.

FIG. 1 is an exemplary overview of a WLL system 11 using Code Division Multiple Access (CDMA) technology as known to the inventor, and according to a preferred embodiment of the present invention. WLL system 11, as described above, uses a modulated CDMA technology that is enhanced with the ability to transmit spread signals, wherein the spread signals are modulated and de-spread at the receiving end. The above-described technology allows for lower bit-error and improved signal quality. The term "advanced" as used by the inventor in front of CDMA refers to an enhancement to signal tracking technology, which is explained below according to embodiments of the present invention.

WLL 11 has a local cell area 33 defined as a wireless range of communication covered by one BS illustrated herein as BS 29. A communication range (R) is illustrated by a radius 22. Surrounding BS 29 are a plurality of exemplary RAUs 17, 19, 21, 23, 25, and 27. Each RAU such as RAU 25, for example, communicates with BS 29 by wireless radio transmission. An RAU such as RAU 25 is considered Customer Premises Equipment (CPE). Each RAU 17–27 is connected to at least a telephone, and may also be connected to fax machines, modems, or other communication devices.

BS 29 is connected, in this case by a land line 31 to a telephony switch 15 connected to the PSTN illustrated herein by a network cloud 13. PSTN 13 may be a private telephone network rather than a public network. A Network-Management-System (NMS) 16 is provided and adapted to supply Operations, Administration, Maintenance and Provisioning (OAMP) control routines to WLL 11 as a whole. NMS 16 is connected to BS 29 by way of a data-control line 32. NMS 16 is largely a software implementation provided to execute on a processor that is located in such as a control station (not shown), which would include or is digitally connected to BS 29.

WLL system 11 may be either a line of sight (LOS) system or a larger multi-path system wherein structure or obtrusive terrain may exist between BS 29 and RAUs 17–27. The inventor is confident that this exemplary overview is sufficient for explanation of both situations. Moreover, there may be many more RAUs such as RAU 17–27 within WLL 11 than are illustrated in this example without departing from the spirit and scope of the present invention. The inventor believes that illustrating 6 RAUs is sufficient for explanation of the present invention.

It is generally known in the art that a WLL system such as system 11 allows full-duplex communication between wireless subscribers as well as between wireless subscribers and PSTN subscribers. In a preferred embodiment of the present invention, WLL 11 uses spread spectrum CDMA technology in order to improve signal reception in single (LOS) as well as multi-path transmission environments as was described above.

BS 29 and each RAU 17–27 have receiving (RX) as well as transmitting (TX) components installed and operable therein as is known in the art. It is to the RX function of both BS 29 and RAUs 17–27 in a CDMA environment that the present invention particularly applies. A unique RX signal tracking method and apparatus provided by the inventor greatly enhances system performance under less than ideal receive conditions. More detail about the receive function and tracking enhancement of BS 29 and RAUs 17–27 according to an embodiment of the present invention is provided below.

Figure 2:
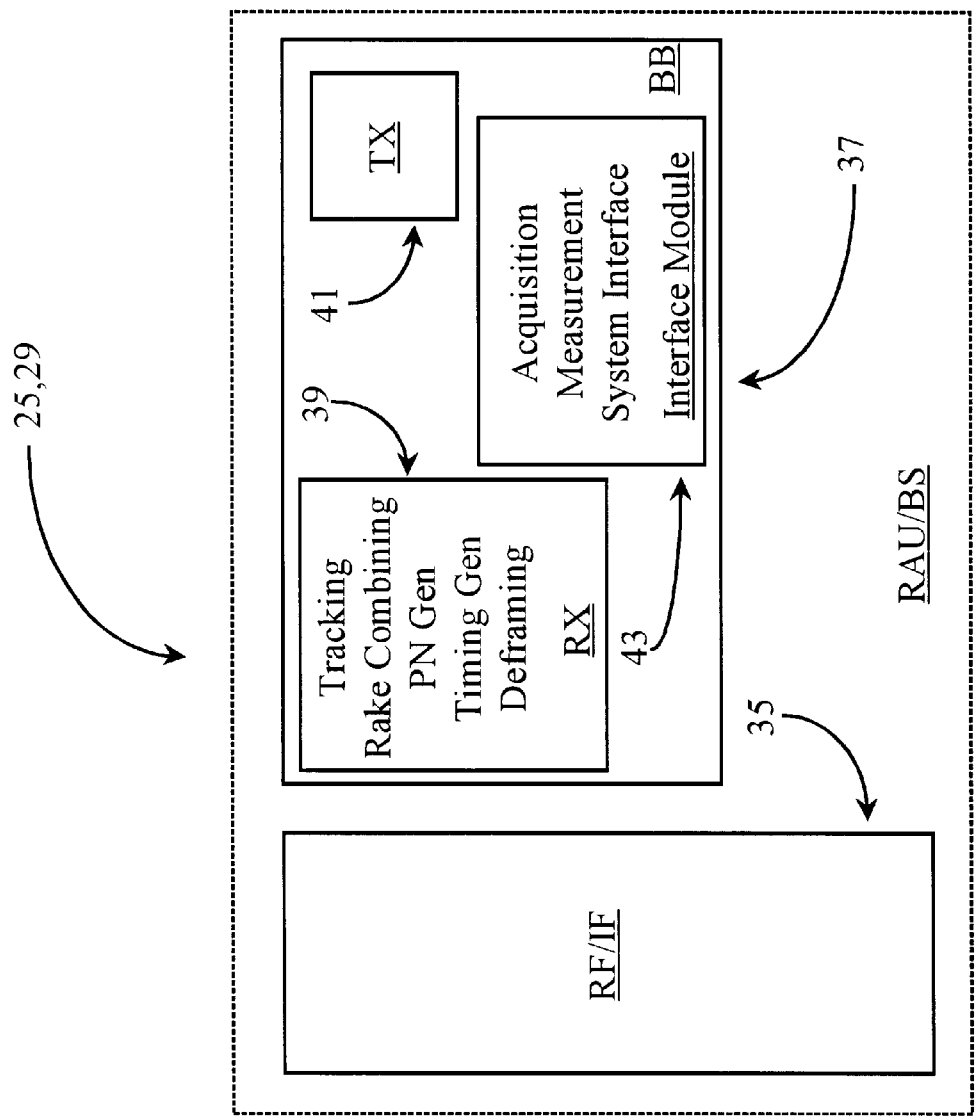
FIG. 2 is a block diagram illustrating various components common to a Remote Access Unit (RAU) and a Base Station (BS) according to an embodiment of the present invention.

FIG. 2 is a block diagram illustrating various components common to a RAU such as RAU 25 and BS 29 according to an embodiment of the present invention. In this example, components common to both BS 29 and, in this case, RAU 25 are illustrated in block form. For example, RAU 25 and BS 29 each have a Radio Frequency/Intermediate Frequency (RF/IF) sector 35 providing an over-the-air wireless interface capability between the two components. Similarly, RAU 25 and BS 29 have a base-band (BB) sector 37 providing the entire signal processing function for a channel.

In a preferred embodiment, BS 29 and each RAU such as RAU 25 are adapted to work with direct sequence (DS) or pseudonoise (PN) spreading and de-spreading technology. The acronyms DS and PN are interchangeable and describe substantially the same signal spreading techniques. Other types of spread signal (SS) techniques include frequency hopping and time hopping. DS spreading is preferred in this embodiment over the other mentioned techniques because of characteristics that are advantageous to telephony communication. Out of the three mentioned modulation techniques DS/SS has the best noise and anti-jam performance, it is the most difficult to intercept, and it operates well against multi-path fade effect.

One with skill in the art of CDMA SS systems will recognize the complicated mathematical properties involved in implementing a DS/SS CDMA system. Therefore, mathematical explanations and equations describing exact DS/SS processes will not be provided in this specification. Specifications describing spread signal technologies are known in the art and available to the inventor through a variety of technical publications. One such specification is the IS-95: air-interface specification standard.

BB sector 37 comprises an interface module 43, a TX block 41, and an RX block 39. Interface module 43 is adapted for signal acquisition, signal measurement, and system interface. TX module 41 is adapted to transmit DS spread signals as known in the art. RX module 39 is adapted for signal reception and tracking, rake combining, pseudonoise (PN) code generation, timing generation, and signal de-framing.

Following is a brief explanation of basic function of RX 39: Signal tracking involves de-spreading a received signal and adjusting system timing to such a received signal. Rake combining involves removing a phase offset from a de-spread received signal output from a signal-tracking process. Rake combining also combines multiple de-spread received signals from the above-mentioned tracking process in multi-path environments.

A PN code generation process involves generating a binary replica of a PN code specific to a received signal for de-spreading purposes. Timing generation involves producing and correcting all necessary timing properties for the rest of the system. Signal de-framing involves extracting a control message, signal power and signal frame control signals, bearer data, and cyclic reduction control (CRC) error correction bits from a received signal frame.

Following is a brief explanation of the function of interface module 43: Acquisition involves acquiring gross received signal timing through acquisition process and passing such timing information to the above-mentioned tracking process. Signal measurement involves quantifying signal strength, frequency offset, and signal-to-noise ratio. System Interfacing involves provision of all necessary control signals required to successfully interface with the rest of the system. The present invention applies to signal tracking function.

In this example, RX block 39 tracks and de-spreads received signals in a single or multi-path environment as described above. The inventor provides a unique and innovative tracking module (not shown in FIG. 2) adapted and enhanced for this purpose. Such a tracking module provided in RX block 39 allows continued tracking of weak signals having peaks below a preset threshold, as well as continued reassignment of a strongest received signal in a multi-path environment. Such enhancements are not known to prior art CDMA SS systems. Such a tracking module enabling optimum signal tracking and reassignment according to an embodiment of the present invention is described in enabling detail below.

Figure 3:
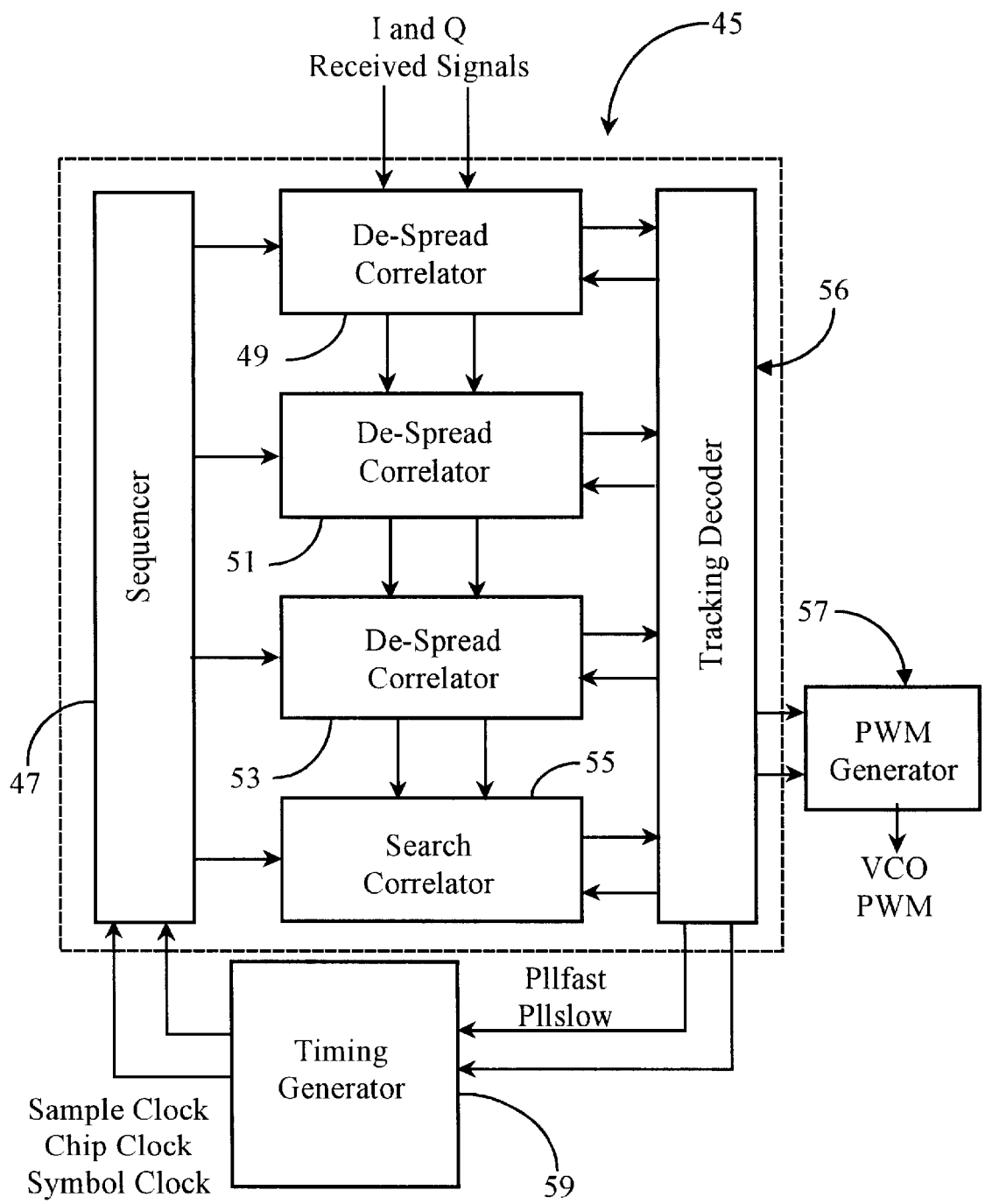
FIG. 3 is block diagram illustrating various components of a tracking module according to an embodiment of the present invention.

FIG. 3 is block diagram illustrating various components of a tracking module 45 according to an embodiment of the present invention. Tracking module 45 differs from typical CDMA tracking modules as described below. Module 45 comprises several sub-modules. Other illustrated components are also important to its function.

Tracking module 45 comprises a sequencer 47, a first de-spread correlator 49, a second de-spread correlator 51, a third de-spread correlator 53, a searcher correlator 55, and a tracking decoder module 56. De-spread correlators 49–53 are responsible for de-spreading received signals by multiplying them with a replica of their PN codes. This is the case for both single path and multi-path environments. Correlators 49–53 also provide signal qualification by comparing signal strength of a received signal with a programmable threshold. Correlators 49–53 also provide timing correction to the system as a whole by tracking the timing of a strongest received spread signal.

A hierarchy exists with regard to de-spread correlators 49–53 and 55. For example, de-spread correlator 49 (first correlator) is the initial active correlator in a multi-path environment. De-spread correlator 49 is the only active de-spread correlator in a single path environment. In a multi-path environment, de-spread correlators 51 and 53 become active in the stated order as required. Searcher correlator 55 searches for any new signals not being tracked by any of de-spread correlators 49–53.

I and Q received signals represent the real and imaginary parts of a received spread signal having completed an acquisition process, which is known in the art. Illustrated directional arrows between modules depict a looping signal and control flow direction utilizing the above-described hierarchy between de-spread correlators 49–53 and searcher correlator 55.

Prior art CDMA DS/SS systems used in mobile cellular implementations use de-spread correlators for de-spreading received spread signals according to PN code designation. Moreover, some systems use multiple correlators for tracking multiple versions of a signal in a multi-path environment as is the case represented here. The standard functions provided by de-spread correlators of prior art are well known to those with skill in the art. However, prior art tracking modules do not accomplish the goal of the present invention, which is to continuously track weak signals for data information while continuously searching for a stronger signal to replace a received weak signal.

Searcher correlator 55 is a novel implementation similar to a de-spread correlator accept that it continuously looks for a new spread signal that is stronger than versions being tracked by de-spread correlators 49–53. Searcher correlator 55 uses an established 32-chip time window within which it continuously searches for a qualified (stronger than threshold) spread signal that is at least one chip (unit of PN sequence) away from other tracked signals. Searcher correlator 55 is always active in a single or multi-path environment. If searcher correlator 55 detects a spread signal stronger than any signal tracked by one of de-spread correlators 49–53, then tracking decoder 56 uses a signal-status indication system known as a "peakdrop/mainsel" system to quantify status of all versions of received and tracked spread signals. More detail about searcher correlator 55 and its integration in tracking module 45 is provided below.

Tracking decoder 56 controls de-spread correlators 49–53 and maintains continuous output for both weak and strong spread signals being tracked by de-spread correlators 49–53. Through integration with searcher correlator 55, decoder 56 provides status indication of all received spread signals, generates new signal timing assignments, and directs the continued operational status of de-spread correlators 49–53 depending on active results. Tracking decoder 56 assigns any new strong signals found by searcher correlator 55 to the appropriate de-spread correlators for continuous tracking.

Sequencer 47 provides all of the proper sequencing function through an internal state machine. An RX timing generator 59 (not part of the tracking module) provides corrected (optimum) timing as taken from a strongest received spread signal to sequencer 47. Three clock definitions provided for timing function are a sample clock (system frequency), a chip clock (PN code sequence), and a symbol clock (higher resolution of chip clock). A Pulse Width Modulation (PWM) generator 57, which is part of system interface and not part of module 45, provides a modulated signal to a Variable Control Oscillator (VO) for effecting an optimum transmitted signal to CPE telephones and the like.

The inventor provides a unique method of integration and control for components of module 45 that allows optimum received signal reception and improved bit-error performance. The method of the present invention is described below for both a single path environment and a multi-path environment. FIG. 3 will be referred to in explanation of the following signal reception situations.

Single Path Embodiment (LOS)

As described above, a single path environment describes a LOS relationship between a BS such as BS 29 of FIG. 1 and a RAU such as RAU 25, also of FIG. 1. In such an environment, fast fading of a received signal may suddenly occur in response to any one of several factors. For example, temporary structure may interfere with reception, such as a vehicle passing through the line-of-site between the RAU and the base station. Sudden weather changes and the like may also cause fast signal fading.

In a single path environment, only de-spread correlator 49 is activated for tracking a strongest signal established by an acquisition process as described above. When a signal is being received, then de-spread correlator 49 multiplies the signal with a replica of the PN code for de-spreading. The de-spreaded signal is then accumulated over a 16-symbol time interval for signal strength qualification purposes. Initialization is set at 16 symbol intervals for measuring peak strength of the received signal. This process measures the peak strength of the signal and compares the value with an internal threshold signal, which is programmable.

Searcher correlator 55 continuously looks for a new version of the signal that is not being tracked by de-spread correlator 49 within a 32-chip time window. De-spread correlator 49, searcher correlator 55 and tracking decoder 56 cooperate with each other such that if the measured peak value of a signal being tracked by correlator 49 is stronger than the internal threshold signal, then tracking decoder 56 assigns a non-active peakdrop status flag to correlator 49 indicating that correlator 49 is tracking the strongest received signal. Tracking decoder 56 maintains continuous output of the signal tracked by correlator 49 and recovers data and timing information from the de-spread signal. Signal timing information is used to generate a timing adjustment signal to RX timing generator 59, which feeds into sequencer 47. This is continuous as long as the signal is tracked.

The above example represents normal operation in a LOS single path scenario wherein a strong signal is received throughout a signal receive frame. However, if a weak signal is received throughout a 32-chip frame then the tracking process of the present invention follows a different course as described below.

De-spread correlator 49, upon receiving a weak signal, begins de-spreading as described above. If a peak value of the received and tracked signal is below the peak value of an internal threshold signal at 16 symbol intervals, and searcher correlator 55 has not found a stronger signal within the receive frame, then correlator 49 continues tracking the weak signal. In this case, tracking decoder 56 assigns a peakdrop status flag for correlator 49 indicating a weak received spread signal and searcher correlator 55 continues searching for a new stronger signal. Tracking decoder 56 disables a timing correction control specific to correlator 49 so that timing adjustment is not performed using a weak signal.

Although timing data for correlator 49 is not valid in this example, data from the tracked signal is still valid and is collected. Prior art systems simply ignore a weak signal until a strong signal arrives often resulting in voice/data dropout. Stripping data from a weak signal, even though timing is not considered, improves data recovery when a qualified signal is received. The result is optimum data/voice recovery in communication.

In yet another LOS scenario, tracking module 45 tracks intermittently weak then strong signals within one receive frame. In this case, the weak signal is de-spread and continuously tracked for data recovery. Tracking decoder 56 assigns a peakdrop status flag and decoder 56 disables timing control for correlator 49. When the signal becomes strong again tracking decoder 56 reactivates a non-active peak-drop status flag. In this case, a non-active peakdrop status is assigned, timing control is re-enabled in decoder 56, and searcher correlator 55 is not involved in the process. During intermittent reception, data from the weak signal is incorporated in data recovery. The result is a smoother data/voice transaction with fewer dropouts.

One with skill in the art will recognize that the method and apparatus of the present invention allows for spread signal recovery in a LOS CDMA DS/SS system even in adverse conditions by continually tracking and extracting data from a weak signal for reducing error rate in reconstructing a channel. It will be appreciated then that the same general method (with some process modification), and apparatus described above will also work in a multi-path situation wherein more than one de-spread correlator must be managed. Such an embodiment is described below and refers to FIG. 3 to aid in explanation.

Multi-path Embodiment

As described above, a multi-path environment involves a system wherein a BS such as BS 29 of FIG. 1 and an RAU such as RAU 25, also of FIG. 1 do not have a LOS relationship. In a case such as this, there may exist structure, terrain, or other natural barriers that act to reflect a transmitted signal causing versions of the signal to arrive at a receiving end by way of varied multiple paths and at different times.

It should be noted here that searcher correlator 55 has all of the signal processing functions that de-spread correlators 49–53 have except that it does not provide timing information or perform signal de-spreading. Searcher correlator 55 acts in conjunction with decoder 56 to pass a new, stronger spread signal "down the tree" and is not used for continuous tracking of a same spread signal. Moreover, searcher correlator 55 cannot be disabled and is constantly searching for a new signal not tracked by any of the active de-spread correlators.

The three basic text examples provided in the above discussion of a single path embodiment also apply here except that in multi-path all three de-spread correlators 49, 51, and 53 become active according to stated order and must be managed by tracking decoder 56. In a multi-path environment, correlator 49 receives and begins tracking a version of a transmitted spread signal followed by correlators 51 and 53, which track separate versions of the spread signal. The three spread signals being tracked represent the three strongest signals at initialization. Versions tracked by correlators 51 and 53 must arrive within the 32-chip time frame described above. Each separate tracked version of a signal must arrive at least one chip apart. The system cannot separate signals that are less than a chip apart.

In a case where all de-spread correlators are receiving qualified spread signals, each de-spread correlator such as correlators 49–53 produces a de-spreaded signal at one symbol clock interval of time. However, only the correlator tracking the strongest signal is tapped for signal timing. Assuming for example that de-spread correlator 53 is tracking the strongest spread signal, then correlators 49 and 51 are assigned non-active peakdrop status flags because their tracked signals are stronger than the threshold. A mainsel status flag is assigned to correlator 53 by tracking decoder 56 indicating that correlator 53 is tracking the strongest signal. Decoder 56 disables the timing controls generic to de-spread correlators 49 and 51. Decoder module 56 uses the timing information from correlator 53 to provide the timing adjustment to RX timing generator 59. In this case, it is assumed that searcher correlator 55 has not found a stronger signal than that tracked by de-spread correlator 53 within a 32-chip window.

In a case where intermittent weak and strong signals are received by tracking module 45 within a signal frame, then the active de-spread correlators such as correlators 49–53 provide de-spreaded signals at each symbol clock interval as described above. Tracking decoder 56 assigns nonactive peakdrop status flags for those correlators tracking signals above the threshold. An active mainsel flag is assigned to the correlator tracking the strongest signal, and timing information is obtained from that correlator as described above. If a strong signal being tracked by any one of de-spread correlators 49–53 then drops in peak value below that of an internal threshold signal, then tracking decoder 56 disables that particular de-spread correlator, generates a zero value for the de-spread signal output. Decoder 56 then activates a peakdrop status flag for that de-spread correlator indicating the current disabled state.

If the deactivated correlator happened to be tracking the strongest spread signal before peakdrop status was activated, then decoder 56 transfers signal timing control to the remaining de-spread correlator now tracking the strongest signal and assigns a corresponding mainsel status flag to that de-spread correlator. Tracking decoder 56 will continue the just-described process until only one de-spread correlator remains active. In this way, the multi-path system resolves to a single path environment for receiving the strongest signal.

If tracking module 45 receives a weak (non-qualified) signal through out a receive frame, meaning that none of the de-spread correlators are enabled in terms of timing control, then the system switches to a single path embodiment by default if searcher correlator 55 does not detect a qualified spread signal by the end of a receive frame. However, if correlator 55 picks up a strong signal within a receive frame, then decoder 56 enables timing control to a de-spread correlator and assigns the signal and a mainsel status to that de-spread correlator.

It will be apparent to one with skill in the art that the method and apparatus of the present invention provides an intelligent tracking function that continuously looks for and incorporates the strongest spread signal received as well as incorporating data from non-qualified signals for channel re-constructive purposes.

It will also be apparent to one with skill in the art that there may be more than three de-spread correlators such as correlators 49–53 in tracking module 45 without departing from the spirit and scope of the present invention. The only requirement is that there at least be two correlators for tracking in a multi-path environment. Similarly, there may be more than one searcher correlator such as correlator 55 without departing from the spirit and scope of the present invention. The inventor illustrates three de-spread correlators and one searcher correlator in a preferred embodiment for performance purposes in resolution back into a single path environment in a multi-path arrangement.

Description of Applicable Circuitry

Figure 4:
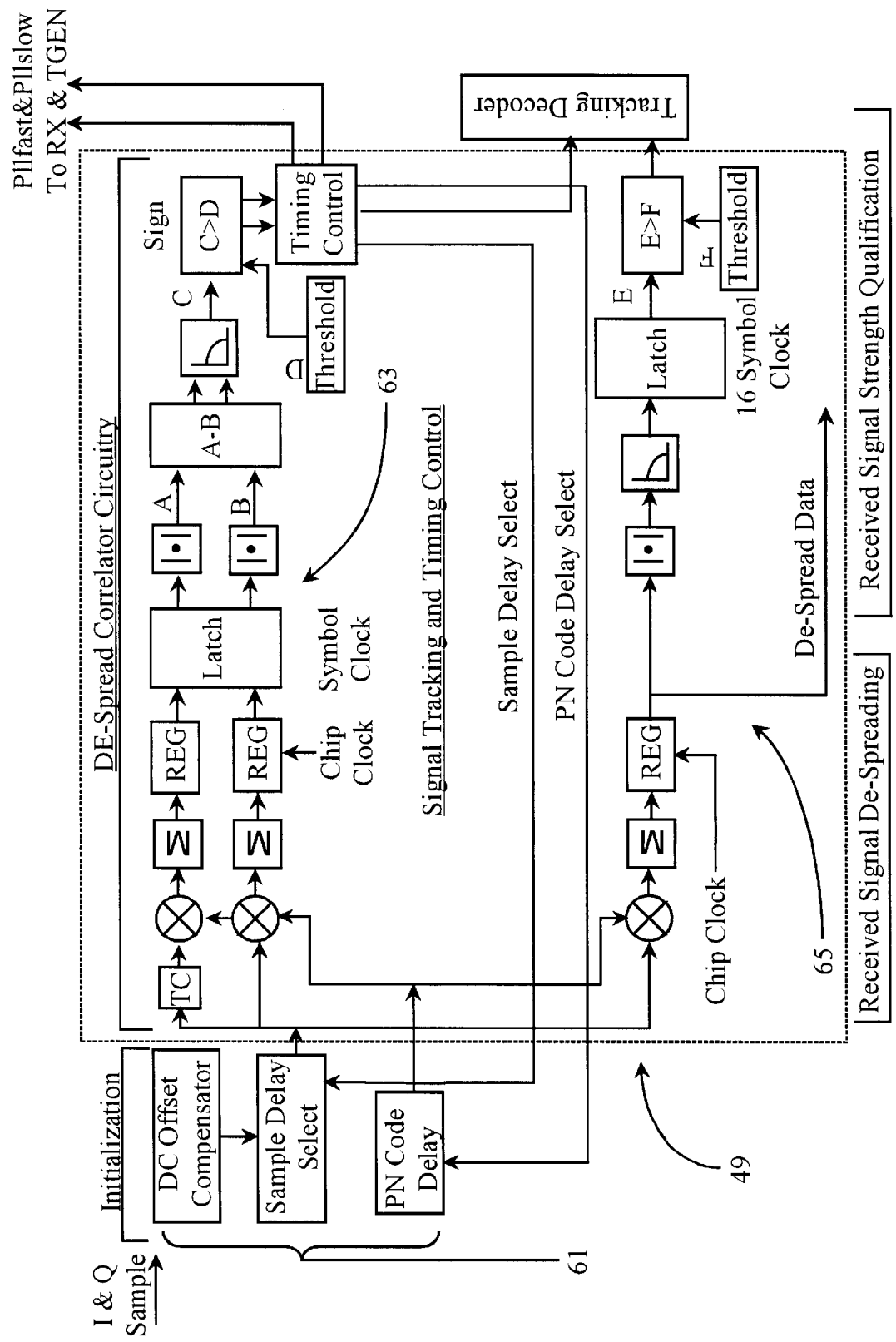
FIG. 4 is a circuitry diagram illustrating the inner circuitry of a de-spread correlator used in the tracking module of FIG. 3 according to an embodiment of the present invention.

FIG. 4 is a circuitry diagram illustrating the inner circuitry of de-spread correlator 49 used in the tracking module of FIG. 3 according to an embodiment of the present invention. Components specific to de-spread correlator 49 are illustrated as within a dotted rectangle defining correlator 49. On the RX (signal receiving) side of correlator 49 there are three modules 61 used in an initialization process. These are a DC offset compensator, which is known in the art for compensating for DC leakage, a sample delay select module for setting a delay period, and a PN code delay, which establishes the signal evaluation interval for evaluating signal strength. PN code delay is initialized at 16 chips in this example. It is noted here that the received spread signal has passed through an acquisition process including AC to DC conversion.

De-spread correlator 49 contains circuitry 63 and circuitry 65 illustrated within the dotted rectangle. Circuitry 63 includes signal tracking and timing control components used for initial signal tracking and signal timing adjustment. Circuitry 65 represents signal de-spreading and signal strength qualification functions. For the purpose of avoiding redundancy, individual components making up circuitry 63 and 65 will not be described as one with skill in the art of signal processing circuitry will readily identify and understand the fundamental circuitry arrangements presented herein.

Arrow direction as illustrated in this example represents direction of signal and corresponding control commands to appropriate modules. In this example, I and Q sample signals represent the real and imaginary parts of a received spread signal as described in FIG. 3. A received spread signal is multiplexed to three circuitry paths. Two in circuitry 63 (signal tracking and timing control) and one in circuitry 65 (de-spreading and peak evaluation) Therefore, the signal is represented as A (time delayed) and B (non-delayed) in the first portion of circuitry 63.

Without delving into the known mathematical equations involved in complex signal processing of the type depicted in the example, it is sufficient to say that the unique signal tracking and signal re-assignment method of the present invention may be accomplished with circuitry components that are known in the art. For example, a time delay (TC) is applied to signal A in circuitry 63. Signal A is delayed by one chip interval. Signal B is not delayed. A complex multiplication sequence is performed on the signals. The signal data of both A and B are stored temporarily in registers (REG) according to a pre-set order. A latch function latches data from the registers according to one symbol clock interval and clears the registers accordingly. The absolute value of A−B, which is represented as C in this example, is compared with a timing threshold illustrated herein as D.

Signal C first passes through a low pass filter. If absolute value C is greater than threshold D then timing is adjusted. Whether timing is advanced or retarded depends on the sign of value C. For example, if the sign is positive timing is advanced according to the value. If the sign is negative, then timing is retarded according to the value. Timing adjustments are fed back into the loop through a sample delay select line and a PN code delay select line. Corrected timing is also sent to the receiving timing generator (RX T-GEN).

Signal de-spreading and strength qualification is simultaneously performed by circuitry 65. A register temporarily stores de-spread data before it is passed out of correlator 49 for decoding. Signal strength qualification is performed after the absolute value of the signal passes through a low pass filter and a latch function, which takes a peak value reading at 16 symbol clock intervals. A Qualified signal represented herein by the letter E is tapped for timing adjustment and tracking decoder enables the timing control module to remain active. In the case, the received spread signal is a strong signal and is continually tracked for data and timing correction and a non-active peakdrop status is assigned. If the de-spread signal E is determined to be less than a peak threshold represented herein by the letter F, then the timing control would be disabled, however de-spreading and strength qualification would continue.

Figure 5:
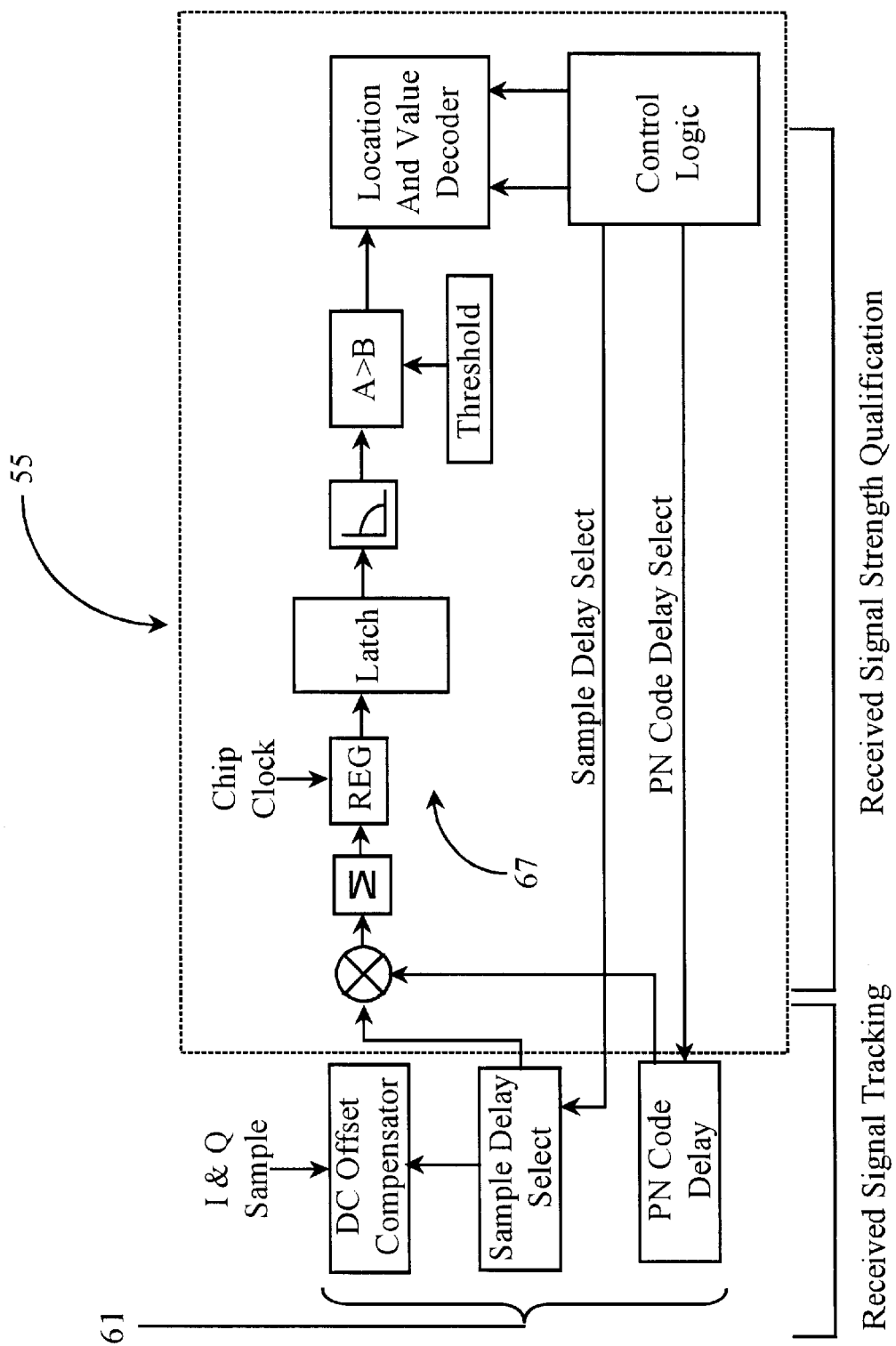
FIG. 5 is a circuitry diagram illustrating the circuitry of a searcher correlator module used in the tracking module of FIG. 3 according to an embodiment of the present invention.

FIG. 5 is a circuitry diagram illustrating the circuitry of searcher correlator 55 used in the tracking module 45 of FIG. 3 according to an embodiment of the present invention. Searcher correlator 55 contains circuitry similar to that found in FIG. 4 except that no de-spreading or timing adjustments are performed to a signal found by correlator 55. A spread signal found by correlator 55 is only tracked until it can be assigned to a de-spread correlator such as one of correlators 49–53 of FIG. 3 for purpose of replacing a weak tracked signal.

A spread signal found by correlator 55 is initialized in the same way as spread signals tracked by de-spread correlators such as correlators 49–53 mentioned above. In this case, signal A and threshold B are processed, accumulated, and registered as was described in FIG. 4. A latching function latches data from both signals at 16 symbol intervals. The signals are passed through a low pass filter and signal A is determined to be greater than the threshold B. A control logic module (labeled control logic) provides tables indicating peak location and peak value to a location and value decoder (labeled thus). Sample delay and PN code delay intervals are corrected only while correlator 55 is tracking a same signal.

It will be apparent to one with skill in the art that a unique signal tracking process such as the one described herein may be integrated with existing CDMA spread signal systems as an enhancement without departing from the spirit and scope of the present invention. In one embodiment, the method and apparatus of the present invention may be adapted to frequency and time hopping methods used in CDMA. There are many possibilities.

Fast Acquisition Module

In one aspect of the present invention, a fast acquisition module is provided for acquiring the initial timing of a received signal and verifying the acquired timing for signal tracking. Such an acquisition module may be provided smaller and less expensive in construction, as well as, faster in establishing an initial signal timing for a received signal due to a unique architecture and novel function.

Figure 6:
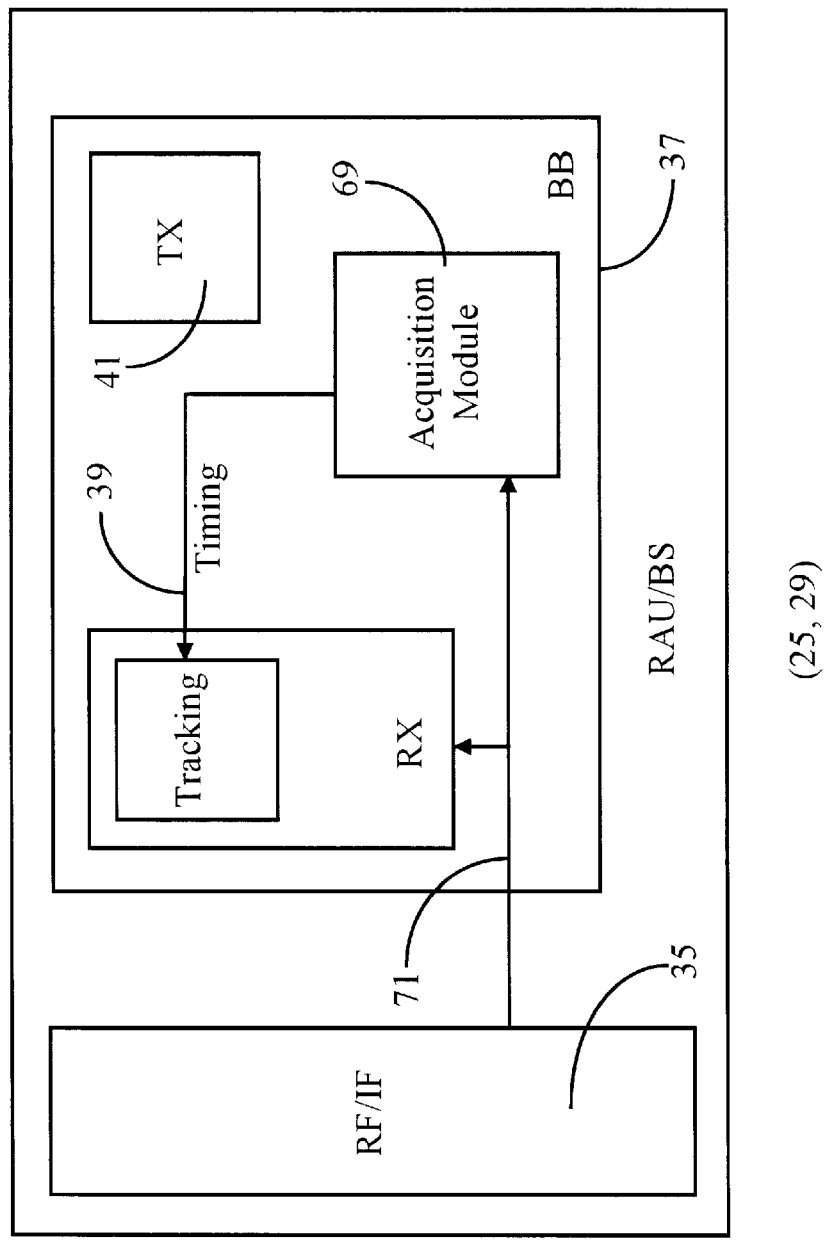
FIG. 6 is a block diagram illustrating components contained within a remote access unit 25 and a base station 29 of FIG. 2 further identifying an acquisition module and signal path according to an embodiment of the present invention.

FIG. 6 is a block diagram illustrating components contained within a remote access unit 25 and a base station 29 of FIG. 2 further identifying an acquisition module and signal path according to an embodiment of the present invention. An acquisition module 69 is provided within base-band 37 of circuitry 25 and 29, which is described in FIG. 2 above. Also described in FIG. 2 above, are an R F module 35, a RX module 39, and a TX module 41, these making up the basic circuitry of RAU 25 (remote access unit) or BS 29 (base station) illustrated in FIG. 1 above. In this embodiment of the present invention, acquisition module 69 will be the focus of discussion. Other functions described generally in FIG. 2 will not be re-introduced with detailed description as they have already been described above and so as not to divert from the focus of present invention.

According to a preferred embodiment, acquisition module 69 is adapted for fast acquisition of signal timing needed for tracking function represented within RX block 39. In this example, I/Q complex samples represented herein by an arrow 71 exiting R F/I F block 35 and progressing to both acquisition module 69 and RX block 39, are received in base-band section 37 by each respective module. Acquisition module 69 acquires the initial timing and, upon successful verification thereof, sends the timing signal to the tracking function contained in RX block 39.

Acquisition module 69 operates quite differently from prior-art acquisition modules in that it divides or sectorizes synchronization code into readable sections and uses a same circuitry block for both timing acquisition and for timing verification. In a preferred embodiment of the present invention, acquisition module 69 processes SYNC gold code, a well-known synchronization code standard. However, this should not be construed as a limitation as the acquisition and verification functions of module 69 may be applied to systems, which utilize other known synchronization schemes.

Figure 7:
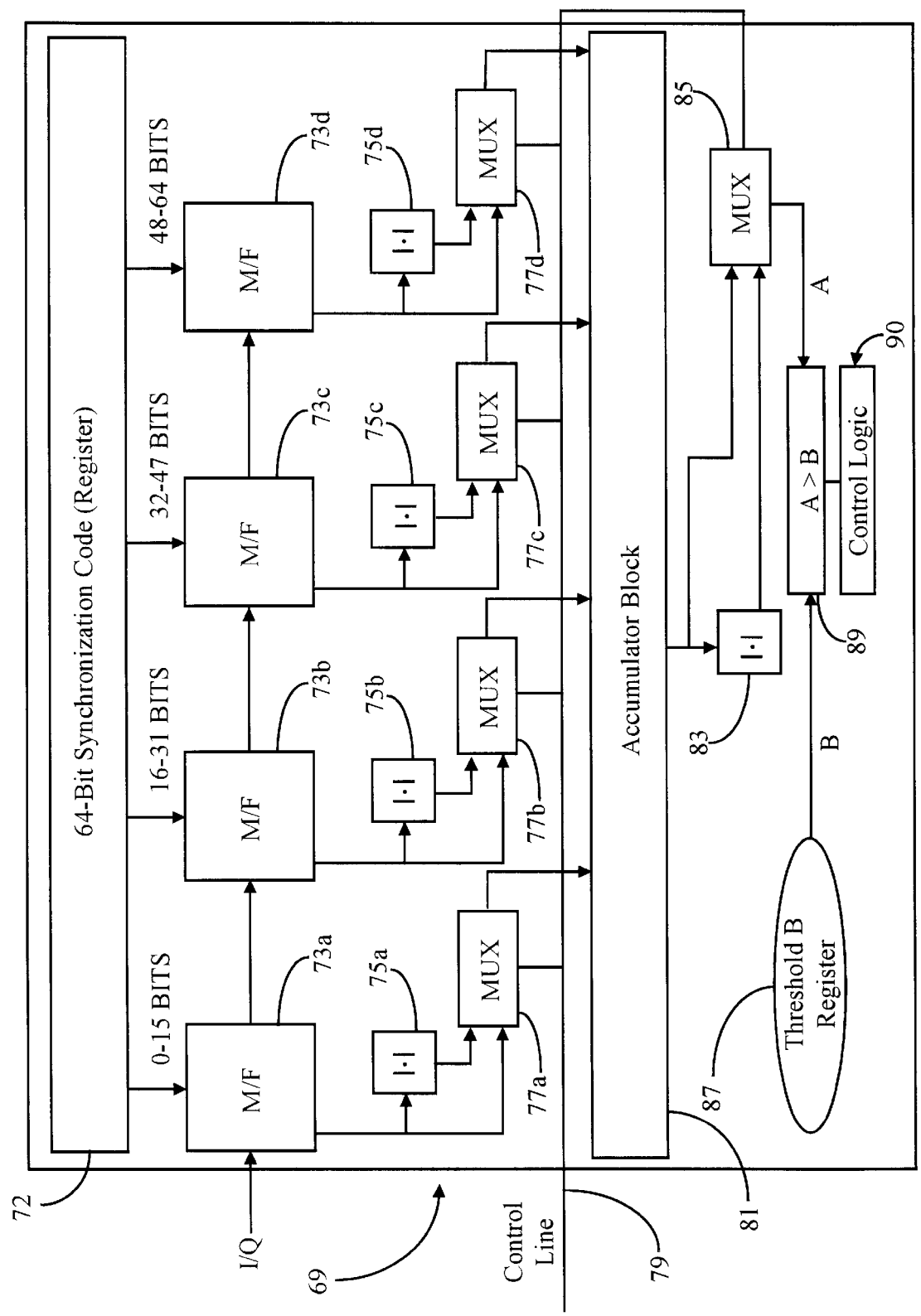
FIG. 7 is a block diagram illustrating various components of the acquisition module of FIG. 6 and their function according to an embodiment of the present invention.

FIG. 7 is a block diagram illustrating various components of acquisition module 69 of FIG. 6 and their functions according to an embodiment of the present invention. In this example, acquisition module 69 comprises a 64-bit synchronization code register 71, 4 16-chips match filters 73a–73d, 5 absolute value blocks (ABS) 75a–75d and 83, an accumulator block 81, a comparator block 89, and a control-logic block 90. Register 71 is responsible for organizing and storing 512 bits of pre-generated synchronization code into 8 64-bit sets loading one 64-bit set at a time. Element number 71 represents 1 64-bit synchronization code set loaded.

In practice of the present invention, match filters 73a–73d operate simultaneously on each 64-bit synchronization-code, each filter processing 16 bits. I/Q complex samples corresponding to the first 64-bit synchronization-code section are streamed into each match filter 73a–d. Each match filter 73a–73d implements a match-filtering algorithm in order to locate co-relation points between synchronization code and I/Q complex samples at ½-chip intervals. It is also noted here, that 16 bits of synchronization code are computed such that there are eight computations, each computation performed on 2-bits of the code, within each match filter 73a–d. In this way, a complete match-filtering operation on 64 bits of synchronization code is performed essentially as a single computational sequence.

In prior-art acquisition processes, initial timing is acquired serially over an entire synchronization-code section. In a preferred embodiment of the present invention, each one of the 8 64-bit synchronization-code sections is processed simultaneously by 4 match filters 73a–d starting with the first set (initial acquisition) and progressing serially to the last or 8th set (verification). It is noted herein, that the first 64-bit synchronization-code section represented by element number 71, is processed for initial timing acquisition. Upon successful acquisition, the remaining 7 synchronization-code sections, are processed for timing verification. Therefore, there are two stages performed before the timing signal is passed to tracking function. These are, an acquisition stage and a verification stage.

To further illustrate the function of circuitry illustrated herein, assume that an initial timing for a first 64-bit synchronization-code section is successfully acquired. It is noted herein, that there are two modes of operation controlled by a control line 79. One is small-phase error-mode and the other is large-phase error-mode. First, a successful timing acquisition in small-phase error-mode will be discussed.

In small-phase error, match-filtering results are summed to form an accumulated weight. An absolute value taken of the weight is compared with a threshold value. Signal timing is acquired if this value is larger than a preset threshold. To further illustrate, match filters 73a–d pass their results to muxing blocks 77a–d respectively, bypassing ABS blocks 75a–d as illustrated by directional arrows entering each mux block 77a–d. After muxing, each value-result produced in each match filter is summed in accumulator block 81. The accumulated sum is then passed to an absolute value block 83 wherein an absolute value is computed from the summation. From accumulator block 81, an absolute value, illustrated herein as value A is passed through a muxing operation illustrated herein by element number 85. A directional arrow illustrated as entering block 85 from block 81 illustrates the just-described data path.

Muxed value A is passed from muxing to comparator 89 wherein it is compared to a preset threshold stored in a register 87. The preset threshold for this example is illustrated as a threshold value B. Block 89 accesses value B from register 87 as illustrated by a directional arrow labeled B. In this example of successful timing acquisition, value A is determined to be greater than threshold value B. Therefore timing acquisition is successful with the first 64-bit synchronization-code section in small-phase error-mode.

If it is determined in comparator 89 that value A is less than value B, then timing is not acquired and the process repeats on the same 64-bit synchronization-code section before moving on to a next section during verification stage. Results from successful acquisition and verification are passed to control logic block 90 for utilization. Block 90 also controls the acquisition and verification procedures.

If received I/Q complex samples exhibit a large phase error, then large-phase error-mode is initiated by virtue of control line 79. It is noted herein, that in a large phase-error situation, it is possible that received signals will have equally positive and negative values and cancel out to 0 during summation. Because of this possibility, results of match filters 73a–d are not summed. Rather, absolute values (4) of the match-filtering results are summed to form an accumulated value (weight). This is illustrated by directional arrows emanating from each match filter 73a–d, leading into ABS blocks 75a–d, and then entering mux blocks 77a–d. After muxing, absolute values are summed in accumulator block 81. An accumulated weight (A) is then passed directly into mux in block 85 bypassing block 83 and subsequently to comparator 89. If in block 89, it is determined that A is greater than B, then signal timing is acquired on a first 64-bit synchronization-code section in large-phase error-mode.

The above-described examples represent successful timing acquisition within a first section of synchronization code. After successful acquisition of a signal-timing a verification process is performed for the remaining sections of synchronization code (448 bits). An example of verification is illustrated below.

FIG. 8 is a block diagram illustrating an acquisition and verification process according to an embodiment of a present invention. In this example, there are eight sections each containing 64 bits of synchronization code. The sections are labeled 0 through 7. As previously described, acquisition module 69 of FIG. 6 loads 1 64-bit section at a time starting from section 0 and completing the process at section 7. This example assumes that signal timing has been acquired in section 0. Therefore, a verification stage consists of the processing of sections 1 through 7. It is noted herein that each 64-bit section within the verification stage takes 10 system clocks for computation.

After signal timing has been acquired within the first 64 bits of synchronization code, as is represented here with section 0, verification begins. At section 1 timing verification proceeds according to the same process described in FIG. 7 above with sampling taken at ½-chip intervals. For example, in section 1, match filtering produces results that resolve to a single value that is measured against a threshold as described in FIG. 7. If the produced value is determined to be greater than a threshold value than verification is successful for section 1 as is illustrated using the term hit to signify success.

The next 64-bit section, or section 2, is loaded and processed identically as was section 1. As can be seen in this example, section 2 has also received a hit meaning that timing was again verified. This process is repeated throughout the seven sections.

In this example, if there are five or more hits occurring within the seven-section verification, then the signal timing acquisition is validated as a successful timing. The successful timing is sent to a tracking module for use and further refinement. Sections 4 and 7 indicate a miss or unsuccessful verification in this example. A miss is defined as an accumulated value that falls below the preset threshold. If there are more than 2 misses within the seven sections of verification, then the acquisition process must be started again at the signal-timing acquisition-phase with section 0 representing the first 64-bit set of synchronization code.

In a preferred embodiment of the present invention, an additional fine tuning enhancement is performed concurrently with the verification sequence in section 1. After acquisition, and during the first verification sequence, the circuitry checks for a better peak correlation at ½-chip off-set positions three more times or for 1.5 chips total. According to this fine tuning enhancement, if a better peak correlation is found, timing is adjusted. If none are found, the original timing prevails. The just-described function is performed in the same circuitry used in the verification process.

It will be apparent to one with skill in the art that the method and apparatus of the present invention may be practiced on any CDMA system utilizing synchronization-phase technology. A fact that the same circuitry within acquisition module 69 can be used for both the acquisition phase and the verification phase, allows module 69 to be kept relatively small compared with prior-art acquisition modules. Furthermore, a fact that module 69 utilizes 4 match filters simultaneously to process 64 bits of synchronization code at a time streamlines and expedites the process as a whole. The spirit and scope of the present invention is limited only by the claims that follow.

What is claimed is:

1. An acquisition module for acquiring signal timing in a CDMA system comprising:
    a register for storing and organizing synchronization code;
    at least 4 match filters for match filtering between I/Q samples and the corresponding synchronization code;
    at least 4 absolute value blocks for determining absolute values of match filtering results;
    a summation function for summing results obtained through match filtering and through absolute value taking; and
    a control logic for controlling the acquisition process;
    characterized in that the acquisition module loads a 64-bit section of synchronization code and I/Q complex samples and match filters them in a simultaneous manner and, upon registering a value greater than a preset threshold, acquires an initial timing, the initial timing being verified over the remaining 64-bit sections of synchronization code using the same control circuitry used in acquiring the timing.

2. The acquisition module of claim 1, wherein both small and large phase error samples are computed using the same control circuitry.

3. The acquisition module of claim 2, wherein match filtering is performed at ½ chip intervals.

4. The acquisition module of claim 3, wherein during the initial verification performed on the first 64-bits of code after acquisition, a fine tuning operation is performed by checking for a better peak correlation at ½-chip offset positions over a duration of 1.5 chips.

5. A method for acquiring signal timing for a CDMA system comprising the steps of:
    a) loading a 64-bit section of synchronization code into an acquisition module;
    b) receiving 64 bits of I/Q complex samples corresponding to the 64-bit section of synchronization code;
    c) match filtering the synchronization code and the I/Q complex samples simultaneously using at least 4 16-bit match filters;
    d) comparing match filtering results with a preset threshold; and
    e) depending upon the comparison, determining whether a received signal timing is acceptable for acquisition and verification.

6. The method of claim 5 wherein in step e), a first comparison of match-filtering results with a preset threshold determines whether or not an initial timing will be acquired, and subsequent comparisons determined whether or not an acquired signal timing will be verified.

7. The method of claim 6 wherein in step (c), both small and large phase error samples are computed using the same control circuitry.

8. The method of claim 7 wherein in step (c), match filtering is performed at ½ chip intervals.

9. The method of claim 8 wherein in step (c), during the initial verification performed on the first 64-bits of code after acquisition, a fine tuning operation is performed by checking for a better peak correlation at ½-chip offset positions over a duration of 1.5 chips.

* * * * *